United States Patent [19]
Yamano et al.

[11] Patent Number: 5,331,420
[45] Date of Patent: Jul. 19, 1994

[54] PIXEL SIGNAL NON-UNIFORMITY CORRECTING DEVICE

[75] Inventors: Shozo Yamano; Shigeyuki Uchiyama, both of Tokyo, Japan

[73] Assignee: Nikon Corporation, Tokyo, Japan

[21] Appl. No.: 766,396

[22] Filed: Sep. 27, 1991

[30] Foreign Application Priority Data

Oct. 29, 1990 [JP] Japan .................... 2-291506

[51] Int. Cl.$^5$ .......................................... H04N 5/335
[52] U.S. Cl. ................................. 348/246; 348/241
[58] Field of Search ............... 358/213.15, 213.17, 358/213.27, 213.28; 250/208.1; 382/54; H04N 3/14, 5/335

[56] References Cited

U.S. PATENT DOCUMENTS

| 4,894,721 | 1/1990 | Matsuda ................ 358/213.17 |
| 4,920,428 | 4/1990 | Lin et al. ................ 358/461 |
| 4,991,127 | 2/1991 | Crookshanks ........... 364/571.04 |
| 5,047,861 | 9/1991 | Houchin et al. ........ 358/213.15 |

FOREIGN PATENT DOCUMENTS 63-238773 10/1988 Japan .................. H04N 5/335

Primary Examiner—Joseph Mancuso
Assistant Examiner—Tuan V. Ho
Attorney, Agent, or Firm—Shapiro and Shapiro

[57] ABSTRACT

A pixel signal correcting device of a type which corrects pixel signals generated by A/D-converting signals output from a plurality of photoelectric sensor elements arrays is provided. In a calibration mode when the arrays are exposed to uniform illuminating light, the pixel signal for each pixel of the arrays is stored, and a reference pixel signal is determined based on the stored pixel signals. A correction value for each pixel is determined based on a difference between the corresponding stored pixel signal and the reference pixel signal, such that all of the correction values have the same sign. The correction values are stored and used for correcting pixel signals generated during a normal operating mode.

5 Claims, 2 Drawing Sheets

PIXEL SIGNAL NON-UNIFORMITY CORRECTING DEVICE

BACKGROUND OF THE INVENTION

1. Field of the Invention

This invention relates to a pixel signal correcting device which helps to eliminate non-uniformity in pixel signals emitted from photoelectric transfer element arrays and used for calculating defocus amount, etc.

2. Related Background Art

In the focus detecting device of a camera of the type which obtains defocus amount to effect automatic focusing, defocus amount calculation has conventionally been carried out after A/D-converting pixel signals emitted from a plurality of photoelectric transfer element arrays.

Theoretically, the output levels of pixel signals emitted from photoelectric transfer element arrays for focus detection should be uniform in the case of an object of a uniform luminance. In practice, however, it is common for the output levels not to be uniform as shown for example in FIG. 5, due to the unevenness in sensitivity of the photoelectric transfer element arrays, the influence of the vignetting factor of the focus-detection optical system for leading light to the photoelectric transfer element arrays, etc. To eliminate this non-uniformity in pixel signals, it has conventionally been the practice to previously store, in a semiconductor memory, correction values respectively corresponding to the pixels, and to perform pixel signal correction in accordance with the correction values thus stored, thereby obtaining uniform pixel signals as shown in FIG. 6.

This correcting calculation is carried out by using, for example, the following formula:

$$AD(n) \times (1 + Q(n)/256) \quad (1)$$

where $AD(n)$ is the A/D-converted value of a pixel output, and $Q(n)$ is a corresponding correction value stored in a semiconductor memory.

The correction value $Q(n)$ consists of signed 8-bit data, which allows a maximum correction of $\pm 50\%$. The correction value $Q(n)$ is determined as follows: First, a surface of a uniform luminance is presented to the photoelectric transfer element arrays to obtain pixel signals therefrom. Then, a pixel is chosen as a reference value, and the differences between this reference value and the pixel signals are obtained as standardized values.

Thus, with such a conventional pixel signal correcting device, each correction value is obtained from variation with respect to a reference value of pixel signals obtained by presenting a uniform-luminance surface to photoelectric transfer element arrays. Accordingly, the variation can generally range from a negative to a positive value, and, consequently, the corresponding correction value which is to be stored in the semiconductor memory also ranges from negative to positive. As a result, the correcting calculation represented by the above formula (1), which is performed by using a microprocessor, necessitates a routine for sign judgment. Since each correction value exhibits a positive or a negative sign and sign judgment has to be made for each pixel, the requisite time for image processing is inevitably rather long.

SUMMARY OF THE INVENTION

It is an object of this invention to provide a pixel signal correcting device which is capable of performing pixel signal correcting calculation with a high level of efficiency.

The invention is applicable, for example, to a device of the type which calculates defocus amount, etc. after A/D-converting pixel signals emitted from photoelectric transfer element arrays.

In accordance with this invention, there is provided a pixel signal correcting device comprising:

- a correction value storage means for storing a correction value for each pixel signal;
- a correction means for correcting an A/D-converted pixel signal by using a corresponding correction value stored in the correction value storage means; and
- a correction value determining means which obtains and stores for each pixel a correction value for making uniform the output levels of pixel signals obtained from an object of a uniform luminance so that the correction values of the correction value storage means exhibit the same sign.

Specifically, the correction value determining means may obtain the maximum one of the pixel signals derived from an object of a uniform luminance, and then calculate correction values having the same sign on the basis of the differences between this maximum-value signal and the remaining pixel signals.

Alternatively, the correction value determining means may obtain the minimum one of the pixel signals derived from an object of a uniform luminance, and then calculate correction values having the same sign on the basis of the differences between this minimum-value signal and the remaining pixel signals.

With the pixel signal correcting device of this invention, the correction values to be stored in a memory means such as a semiconductor memory are obtained such that they exhibit the same (i.e., all positive or negative) sign so that no routine for sign judgment is required in the correcting calculation, whereby the processing load and, consequently, the requisite image processing time can be reduced.

DESCRIPTION OF THE PREFERRED EMBODIMENTS

Figure 1:
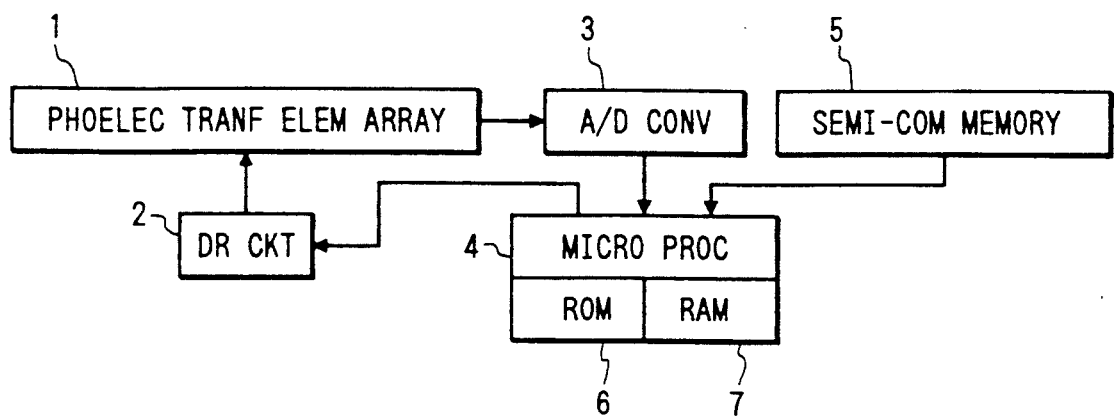
FIG. 1 is a block diagram of an embodiment of this invention.

FIG. 1 is a block diagram showing the construction of an embodiment of this invention.

In FIG. 1, the reference numeral 1 indicates photoelectric transfer element arrays consisting of 1-line-type CCDs or the like. In the case of a focus detecting device, a pair of photoelectric transfer element arrays are generally used, effecting image formation for an object image obtained from a focus detection optical system. The photoelectric transfer element arrays 1 are driven by a drive circuit 2, whereby pixel signals are read out, which are A/D-converted by an A/D converter 3 and then supplied to a microprocessor 4 for performing image processing by program control. Connected to the microprocessor 4 is a semiconductor memory 5 serving as a correction value storage means, and previously stored in this semiconductor memory 5 are correction values for eliminating non-uniformity in the pixel signals obtained from the photoelectric transfer element arrays 1. In the present invention, all the correction values stored in the semiconductor memory 5 exhibit the same positive or negative sign. Further, provided in the microprocessor 4 are a RAM 7 serving as a data memory and a ROM 6 serving as a program memory. The microprocessor 4 functions as a correction means, which corrects the A/D-converted pixel signals by using the correction values stored in the semiconductor memory 5, and, at the same time, as a correction value determining means, which obtains and stores, for each pixel, a correction value for making uniform the output levels of the pixels obtained from an object of a uniform luminance such that the correction values previously stored in the semiconductor memory 5 have the same positive or negative sign.

Figure 2:
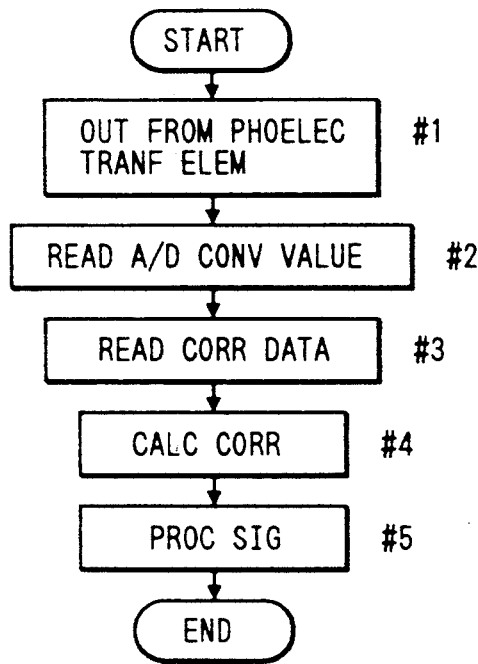
FIG. 2 is a flowchart illustrating a correction processing in accordance with this invention.

FIG. 2 is a flowchart illustrating a correction processing in accordance with this invention, which is performed by using the microprocessor 4 of FIG. 1.

First, in step #1 of FIG. 2, the microprocessor 4 drives the drive circuit 2 to cause the photoelectric transfer element arrays 1 to emit pixel signals, which are converted to pixel data by the A/D converter 3. Then, in step #2, the pixel data obtained through A/D conversion, AD(1) through AD(n), is read and stored in the RAM 7 serving as a data memory.

Subsequently, in step #3, a first correction value Q(1) is read from the semiconductor memory 5. Then, in step #4, the pixel signal AD(1) obtained through A/D conversion is read from the RAM 7, and the following calculation is executed:

$$AD(1) \times (1 + Q(1)/256)$$

That is, $$AD(1) + AD(1) \times Q(1)/256 \quad (2)$$

Here, the first and second terms of formula (2) are connected by addition, and, since the correction data Q(1) is obtained as positive data, no routine for sign judgment is required in executing the calculation of formula (2). It is only necessary to perform the addition.

A similar calculation is executed on the remaining pixel data AD(2) through AD(n) obtained through A/D conversion.

Figure 3:
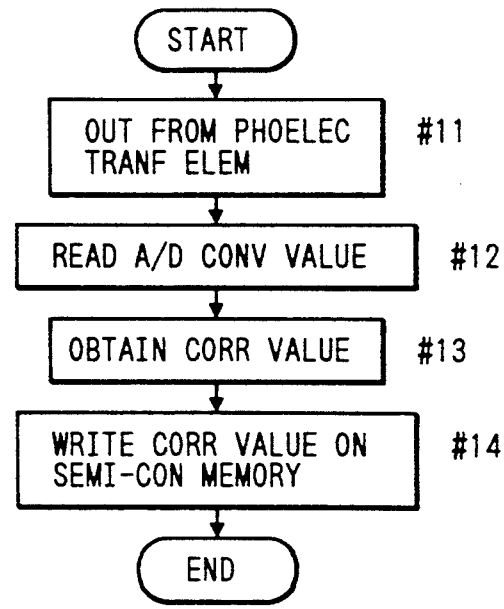
FIG. 3 is a flowchart illustrating a processing for obtaining correction values in accordance with this invention.

FIG. 3 is a flowchart illustrating a processing for obtaining the correction data Q(1) through Q(n) to be stored in the semiconductor memory 5 of FIG. 1.

First, in step #11 of FIG. 3, a uniform-luminance surface is presented to the photoelectric transfer element arrays 1, and the microprocessor 4 drives the circuit 2 to cause pixel signals to be emitted, which are converted to pixel data by the A/D converter 3.

Next, in step #12, the pixel data from the photoelectric transfer element arrays 1, which has been A/D-converted by the A/D converter 3 to correction values AD(1) through AD(n), is read and stored in the RAM 7 serving as a data memory.

Subsequently, in step #13, the AD-converted pixel data of the RAM 7, AD(1) through AD(n), is used to obtain corresponding correction values. Finally, in step #14, the correction values thus obtained are written to the semiconductor memory 5, with which a series of correction value determining processes are completed.

Figure 4:
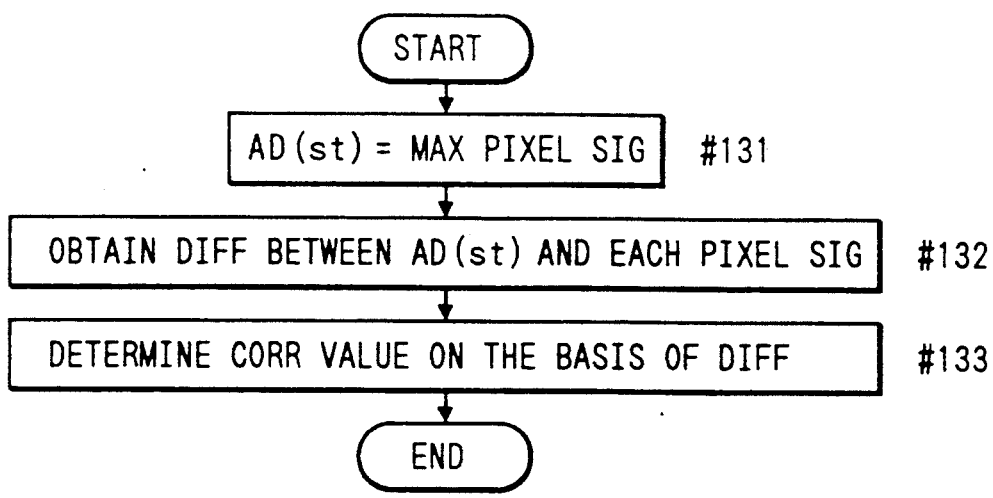
FIG. 4 is a detailed flowchart illustrating a processing for obtaining correction values in accordance with this invention.
Figure 5:
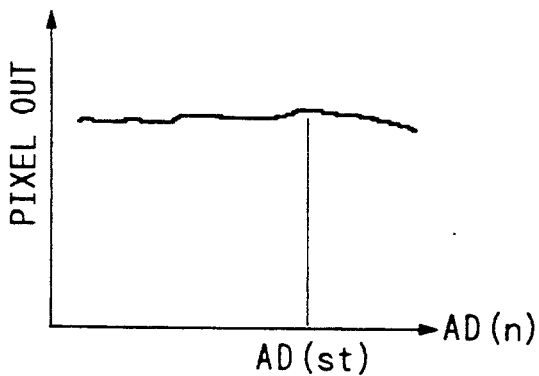
FIG. 5 is a chart illustrating an output from photoelectric transfer element arrays upon presentation thereto of a surface of a uniform luminance.
Figure 6:
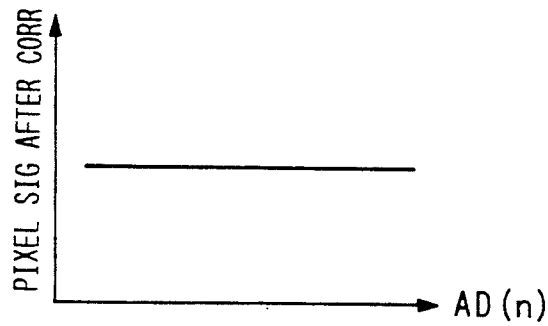
FIG. 6 is a chart illustrating a corrected output from photoelectric transfer element arrays upon presentation thereto of a surface of a uniform luminance.

FIG. 4 is a flowchart illustrating in detail the correction value calculating process in step #13 of FIG. 3.

In step #131 of FIG. 4, the maximum value of the A/D-converted data AD(1) through AD(n), derived from the uniform-luminance surface, is obtained to be used as a reference value AD(st).

Next, in step #132, the differences between the reference value AD(st) and the values of the rest of the A/D-converted data, AD(1) through AD(n), are obtained. Regarding the first value of the data, for example, the difference to be obtained is:

$$AD(st) - AD(1) \quad (3)$$

This value is always positive.

Next, in step #133, the difference between the reference value obtained in step #131 and the A/D-converted data is obtained and standardized on the basis of the pixel output.

$$\text{That is, } Q(1) = \frac{\{AD(st) - AD(1)\}}{AD(1)} \times 256 \quad (4)$$

Here, multiplication by 256 is effected so as to make the correction data 8-bit data.

A similar calculation is performed on the remaining values AD(2) through AD(n), and the values thus obtained, Q(1) through Q(n), constitute the correction values respectively corresponding to the pixel signals. As a result of this processing, all the values of the correction data become positive, so that no routine for sign judgment is required in the correcting calculation.

While in the explanation of FIG. 4 the maximum value was adopted as the reference value AD(st), it is also possible to adopt, for example, the minimum value, as the reference value. In that case, formulae (3) and (4) are respectively changed as follows:

$$AD(1) - AD(st) \quad (5)$$

$$Q(1) = \frac{\{AD(1) - AD(st)\}}{AD(1)} \times 256 \quad (6)$$

The correcting calculation, which was executed in accordance with formula (2) in the above case, is executed here in accordance with the following formula:

$$AD(1) - AD(1) \times Q(1)/256 \quad (7)$$

Since the first and second terms of this formula is connected by subtraction and the correction data is always positive in this case also, there is no need to provide a routine for sign judgment, While the above embodiment has been described as applied to pixel signal correction for focus detection, it is applicable, equally to any type of pixel signal correction.

Thus, in accordance with this invention, correction values for output signals from photoelectric transfer element arrays are obtained as follows: The maximum or the minimum one of pixel signals derived from an object of a uniform luminance is adopted as a reference value, and correction values are obtained on the basis of this reference value in such a manner that they exhibit the same sign. Photoelectric transfer signals in actual use are corrected by using these correction values. Accordingly, there is no need to discriminate between the positive and negative signs when carrying out correcting calculation, thus reducing the requisite time for the calculation.

Furthermore, in the case where the minimum value is adopted as the reference value, the data before correction never exceeds that after correction, so that there is advantageously no need to take into account overflow in managing data processing.

What is claimed is:

1. A pixel signal correcting device of the type which corrects pixel signals generated by A/D-converting signals output from a plurality of photoelectric sensor element arrays, comprising:
    means for storing pixel signals generated when the arrays are exposed to uniform illuminating light in a calibration mode,
    reference pixel signal determining means operating to determine a reference pixel signal based on the stored pixel signals,
    correction value determining means operating to determine a correction value for each pixel based on a difference between the corresponding stored pixel signal and said reference pixel signal, such that all of the correction values have the same sign,
    means operating to store the correction values, and
    correction means for correcting pixel signals generated during a normal operation mode, based on the corresponding stored correction values and without individually judging whether the signs of the respective correction values are positive or negative.

2. A device according to claim 1, wherein said reference pixel signal determining means selects a stored pixel signal of maximum value as the reference pixel signal.

3. A device according to claim 2, wherein said correction value determining means determines the correction values for each pixel according to the following formula:

$$Q(n) = \frac{\{AD(st) - AD(n)\}}{AD(n)} \times K$$

wherein
   Q(n): correction value for nth pixel, wherein is from 1 to the total number of pixels,
   AD(st): value of the reference pixel signal,
   AD(n): value of stored pixel signal for nth pixel, and
   K: constant.

4. A device according to claim 1, wherein said reference pixel signal determining means selects a stored pixel signal of minimum value as the reference pixel signal.

5. A device according to claim 4, wherein said correction value determining means determines the correction value for each pixel according to the following formula:

$$Q(n) = \frac{\{AD(st) - AD(n)\}}{AD(n)} \times K$$

where
   Q(n): correction value for nth pixel, where n is from 1 to the total number of pixels,
   AD(st): value of the reference pixel signal,
   AD(n): value of stored pixel signal for nth pixel, and
   K: constant.

* * * * *